United States Patent
Hosaka et al.

(10) Patent No.: US 7,163,765 B2
(45) Date of Patent: Jan. 16, 2007

(54) BIPOLAR BATTERY

(75) Inventors: Kenji Hosaka, Yokosuka (JP);
Tatsuhiro Fukuzawa, Yokohama (JP);
Kouichi Nemoto, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 412 days.

(21) Appl. No.: 10/681,157

(22) Filed: Oct. 9, 2003

(65) Prior Publication Data

US 2004/0091771 A1    May 13, 2004

(30) Foreign Application Priority Data

Nov. 7, 2002    (JP)    ............... P2002-323971

(51) Int. Cl.
*H01M 2/08*    (2006.01)
*H01M 6/48*    (2006.01)
*H01M 6/22*    (2006.01)
*H01M 6/46*    (2006.01)

(52) U.S. Cl. ............... 429/185; 429/300; 429/210; 429/162; 29/623.2

(58) Field of Classification Search ............... 429/185, 429/300, 210, 162
See application file for complete search history.

(56) References Cited

U.S. PATENT DOCUMENTS 3,960,599 A * 6/1976 Reynier et al. ............ 29/592.1
5,141,828 A   8/1992 Bennion et al.
2004/0043288 A1 * 3/2004 Nishijima et al. ............ 429/162

FOREIGN PATENT DOCUMENTS

| JP | 5-47360    | 2/1993 |
| JP | 8-7926     | 1/1996 |
| JP | 11-204136  | 7/1999 |
| JP | 11-238528  | 8/1999 |
| JP | 2000-164178 | 6/2000 |
| JP | 2000-268789 | 9/2000 |

OTHER PUBLICATIONS

Japanese Office Action issued in corresponding Japanese Patent Application No. JP 2002-323971, dated Aug. 8, 2006.

* cited by examiner

*Primary Examiner*—Patrick Joseph Ryan
*Assistant Examiner*—Karie O'Neill
(74) *Attorney, Agent, or Firm*—McDermott Will & Emery LLP

(57) ABSTRACT

A bipolar battery comprises a bipolar electrode in which a positive electrode is provided on one surface of a collector and a negative electrode is provided on the other surface of the collector, a gel electrolyte sandwiched between the positive electrode and the negative electrode, and a sealing layer which is provided between the collectors and surrounds a periphery of a single cell including the positive electrode, the negative electrode, and the gel electrolyte.

7 Claims, 9 Drawing Sheets

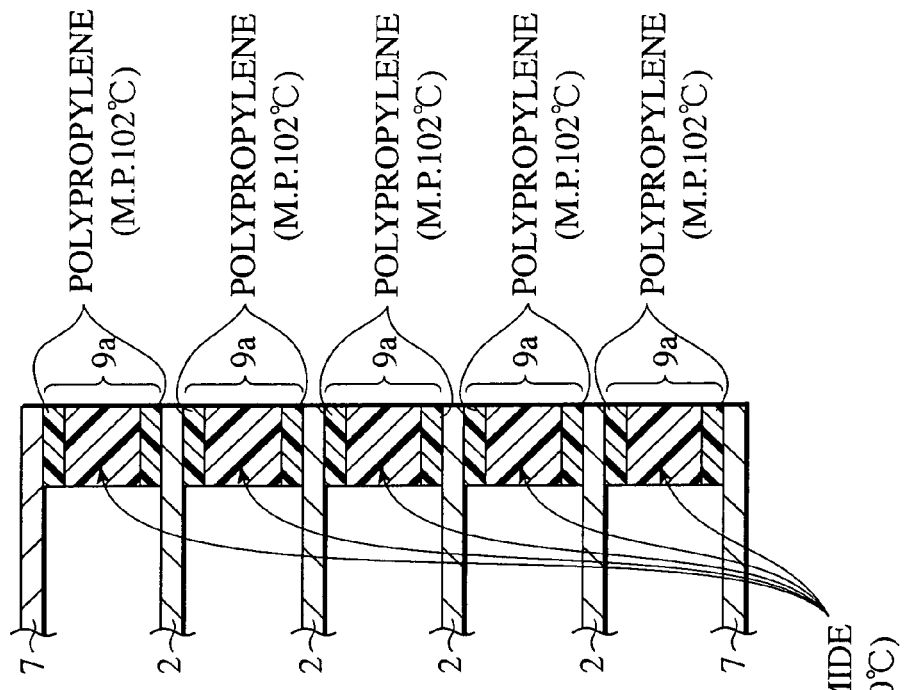
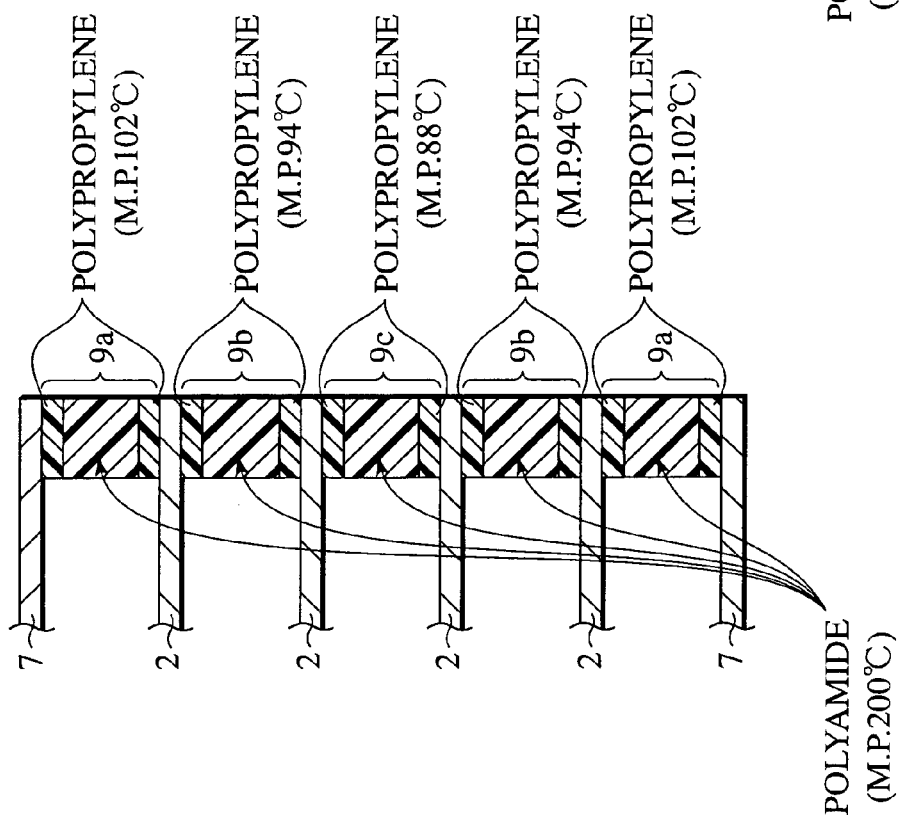
FIG.6A
FIG.6B

BIPOLAR BATTERY

BACKGROUND OF THE INVENTION

1. Field of the Invention

The present invention relates to a bipolar battery.

2. Description of the Related Art

Lithium ion secondary batteries include those using a solid electrolyte, a liquid electrolyte, and a polymer gel electrolyte, respectively, as electrolytes to be encapsulated therein.

The lithium ion secondary battery using the solid electrolyte is that using a solid polymer electrolyte, such as polyethylene oxide, as the only electrolyte thereof. On the other hand, for the liquid electrolyte, only an electrolysis solution is used. The polymer gel electrolyte is considered to be an intermediate of a solid electrolyte and a liquid electrolyte. The polymer gel electrolyte includes one in which an electrolysis solution is held among chains of polymer such as polyvinylidene fluoride (PVDF) which has no lithium ion conductivity in itself (refer to Japanese Patent Application Laid-Open No. H11-204136).

SUMMARY OF THE INVENTION

However, when constructing a single cell using the polymer gel electrolyte and stacking a plurality of the single cells to make a bipolar battery, there has been a problem that the electrolyte oozes between each of the single cells and contacts with the electrolyte of another single cell, thus causing a short circuit, called a liquid junction, between the single cells.

The present invention was made in consideration of the above-described problems. It is an object of the present invention to provide a bipolar battery in which the liquid junction between the single cells is prevented even when stacking the plurality of single cells using the polymer gel electrolyte to construct the bipolar battery.

The first aspect of the present invention provides a bipolar battery, comprising: a bipolar electrode in which a positive electrode is provided on one surface of a collector, and a negative electrode is provided on the other surface of the collector; a gel electrolyte sandwiched between the positive electrode and the negative electrode; and a sealing layer which is provided between the collectors and surrounds a periphery of a single cell including the positive electrode, the negative electrode, and the gel electrolyte.

The second aspect of the present invention provides an assembled battery, comprising: a plurality of bipolar battery connected in series and/or in parallel, the bipolar battery, comprising: a bipolar electrode in which a positive electrode is provided on one surface of a collector, and a negative electrode is provided on the other surface of the collector; a gel electrolyte sandwiched between the positive electrode and the negative electrode; and a sealing layer which is provided between the collectors and surrounds a periphery of a single cell including the positive electrode, the negative electrode, and the gel electrolyte.

The third aspect of the present invention provides a vehicle, comprising an assembled battery including a plurality of bipolar battery connected in series and/or in parallel, the bipolar battery comprising: a bipolar electrode in which a positive electrode is provided on one surface of a collector, and a negative electrode is provided on the other surface of the collector; a gel electrolyte sandwiched between the positive electrode and the negative electrode; and a sealing layer which is provided between the collectors and surrounds a periphery of a single cell including the positive electrode, the negative electrode, and the gel electrolyte.

The fourth aspect of the present invention provides a method for manufacturing a bipolar battery, comprising: forming a bipolar electrode in which a positive electrode is provided on one surface of a collector and a negative electrode is provided on the other surface of the collector; sandwiching a gel electrolyte between the positive electrode and the negative electrode, and simultaneously sandwiching a sealing layer between the collectors in a periphery of a single cell including the positive electrode, the negative electrode, and the gel electrolyte; and heating and pressurizing a portion of the sealing layers from sides of end collectors in a state where a plurality of the bipolar electrodes, the gel electrolytes and the sealing layers are stacked on each other.

BRIEF DESCRIPTION OF THE DRAWINGS

The invention will now be described with reference to the accompanying drawings wherein;

FIG. 6A and 6B are views illustrating structures of sealing layers used in the adhesive strength test;

DETAILED DESCRIPTION OF THE PREFERRED EMBODIMENTS

Hereinafter, description will be made of embodiments of the present invention with reference to the drawings.

Figure 1:
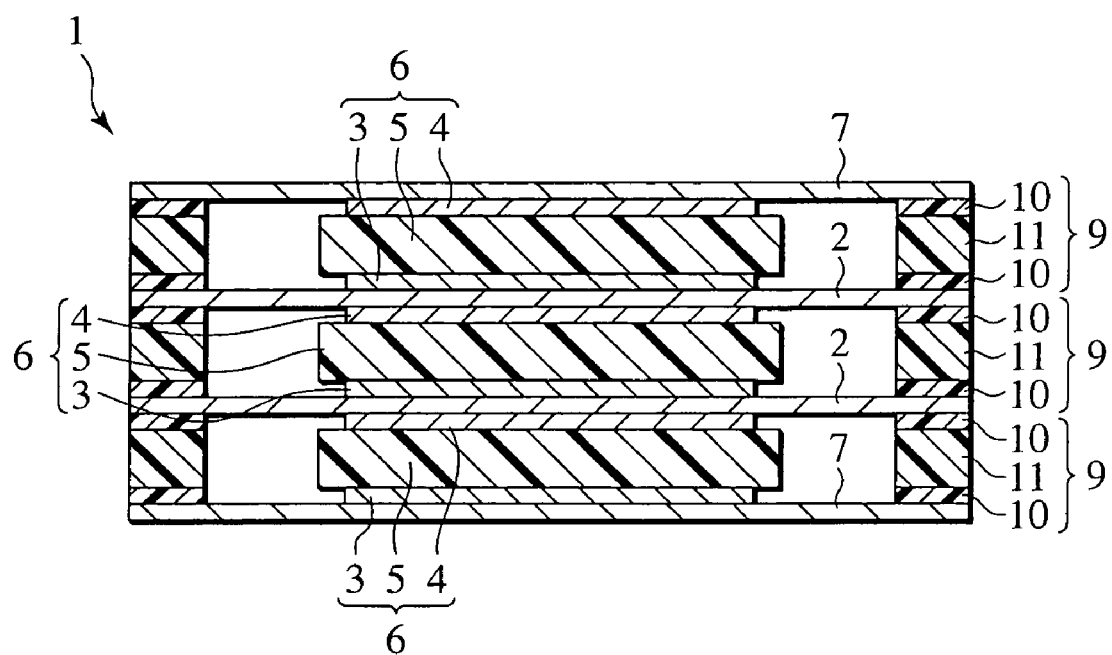
FIG. 1 is a cross-sectional view illustrating a structure of an electrode stacked body of a bipolar battery according to the present invention.
Figure 2:
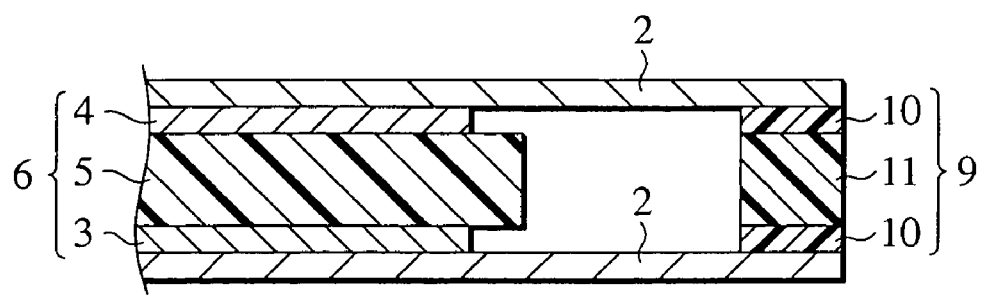
FIG. 2 is a partially enlarged view illustrating a single cell of the bipolar battery according to the present invention.
Figure 3:
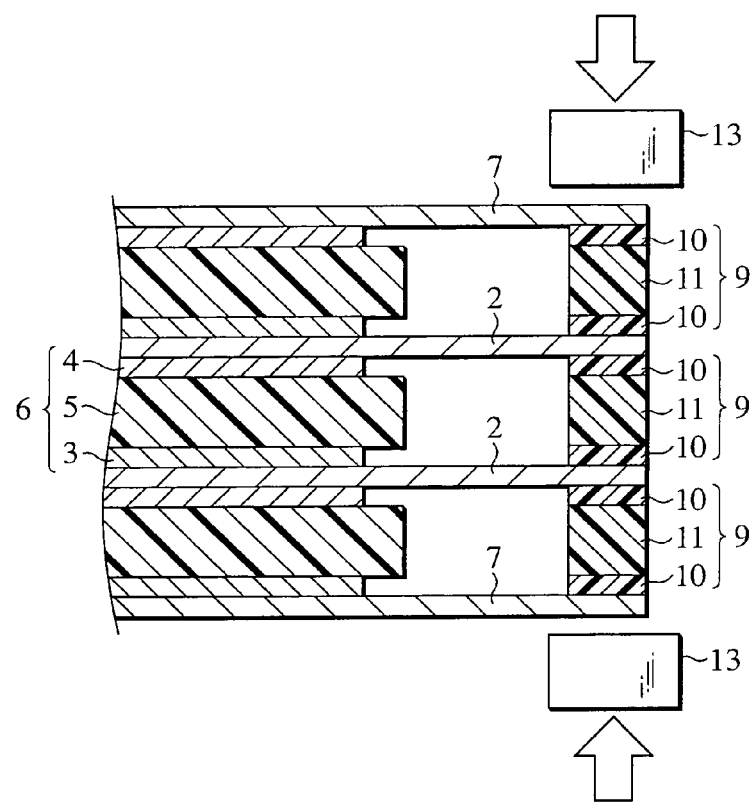
FIG. 3 is a cross-sectional view illustrating a method for manufacturing the electrode stacked body of the bipolar battery according to the present invention.

As shown in FIGS. 1 to 3, in the bipolar battery of the present invention, a positive electrode layer 3 and a negative electrode layer 4 are respectively formed on each surface of a collector 2. The positive electrode layer 3 and the negative electrode layer 4 on the collector 2 sandwich an electrolyte layer 5 to construct a single cell 6. This bipolar battery includes an electrode stacked body 1 in which a plurality of the single cells 6 is stacked. Collectors 7 (also referred to as end collectors 7) at both ends in a stacked direction have a structure in which either the positive electrode layer 3 or the negative electrode layer 4 is formed. Here, the structure in which the positive electrode layer 3 and the negative electrode layer 4 are provided on the collector 2 is called a bipolar electrode.

The electrolyte layer 5 used herein is a gel electrolyte in which an amount from a little to 98 wt % of an electrolysis solution is held among polymer chains. In this embodiment in particular, a polymer gel electrolyte holding 70 wt % or more of the electrolysis solution can be used.

In this bipolar battery, in order to prevent liquid leakage from the single cells 6, sealing layers 9 are provided, which are placed between each of the collectors 2 and 7, and surround the peripheries of the respective single cells 6.

The sealing layer 9 is constructed by first resin 10 which has a low melting point and is thermally adhesive and second resin 11 which is non-conductive and has a higher melting point than that of the first resin 10. As shown in FIG. 2, the first resin 10 is placed on the side of the collector 2, and two pieces of the first resin 10 sandwich the second resin 11 therebetween, thus constructing three layers. Since the sealing layer 9 is constructed to have three layers as above, both of the collectors 2 and 7 and the second resin 11 are thermally adhered through the first resin 10, by heating and pressurizing at a temperature higher than the melting point of the first resin 10 and lower than that of the second resin 11. Specifically, the first resin 10 melts during the thermal adhesion, and bonds both collectors 2 and 7 and the second resin 11, and then seals the electrolyte layer 5 in a space formed by the collectors 2 and 7 as well as the sealing layer 9. Thus, electrolyte is kept from leaking, and thereby liquid junction between the single cells 6 is prevented.

A method of manufacturing this bipolar battery is as follows. As shown in FIG. 3, the single cells 6 and collectors 2 and 7 are used. Each of the single cells 6 is one in which the positive electrode layer 3 and the negative electrode layer 4, each being formed on the collectors 2, face each other while sandwiching the electrolyte layer 5 therebetween. The end collectors 7 have only the positive electrode layer 3 or the negative electrode layer 4 formed thereon. The collectors 2 and 7 sandwich the sealing layer 9 therebetween at the periphery of each of the single cells 6, and a plurality of these layers are stacked to form a electrode stacked body 1. Then, the space formed by the collectors 2 and 7 as well as the sealing layer 9 are sealed by pressurizing the sealing layer portions using presses 13 while heating.

When the heating temperature is, for example, 180 degrees centigrade, the first resin 10 is preferably a resin having a melting point lower than 180 degrees centigrade. To be specific, a material that can be used is thermoplastic olefin rubber or general purpose plastic such as polypropylene (PP), polyethylene (PE), and polyurethane. The melting point of polypropylene is about 160 to 170 degrees centigrade, the melting point of linear low density polyethylene is about 130 degrees centigrade, and the melting point of polyurethane is about 130 degrees centigrade. On the other hand, the second resin 11 may be any material as long as it is a non-conductive resin which has a melting point of about 180 degrees centigrade or higher and can be thermally adhered to the first resin 10. For example, polyamide-based resin such as nylon 6 and nylon 66 can be used. In addition, for the second resin 11, it is possible to use polytetrafluoroethylene (PTFE), polyvinylidene fluoride, polystyrene, and the like, furthermore silicone rubber and the like. The melting point of nylon 6 is about 225 degrees centigrade, the melting point of nylon 66 is about 267 degrees centigrade, the melting point of PTFE is about 320 degrees centigrade, the melting point of polyvinylidene fluoride is about 210 degrees centigrade, and the melting point of polystyrene is about 230 degrees centigrade. Furthermore, the silicone rubber is usable at about 250 degrees centigrade.

Apart from the above, various resins can be used. Preferably, the second resin 11 having a higher melting point than that of the first resin 10 is selected, and the first and second resin 10 and 11 are adhered by heating and pressurizing at a temperature between the melting points thereof.

Figure 4:
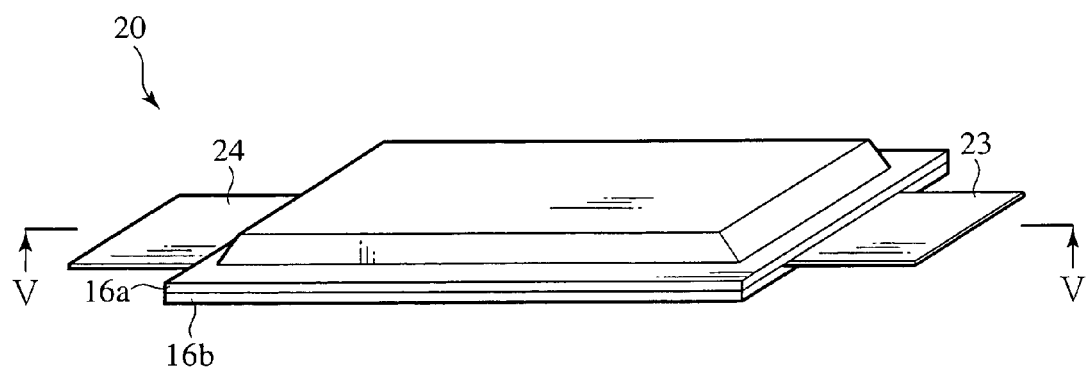
FIG. 4 is a perspective view illustrating the bipolar battery of the present invention.
Figure 5:
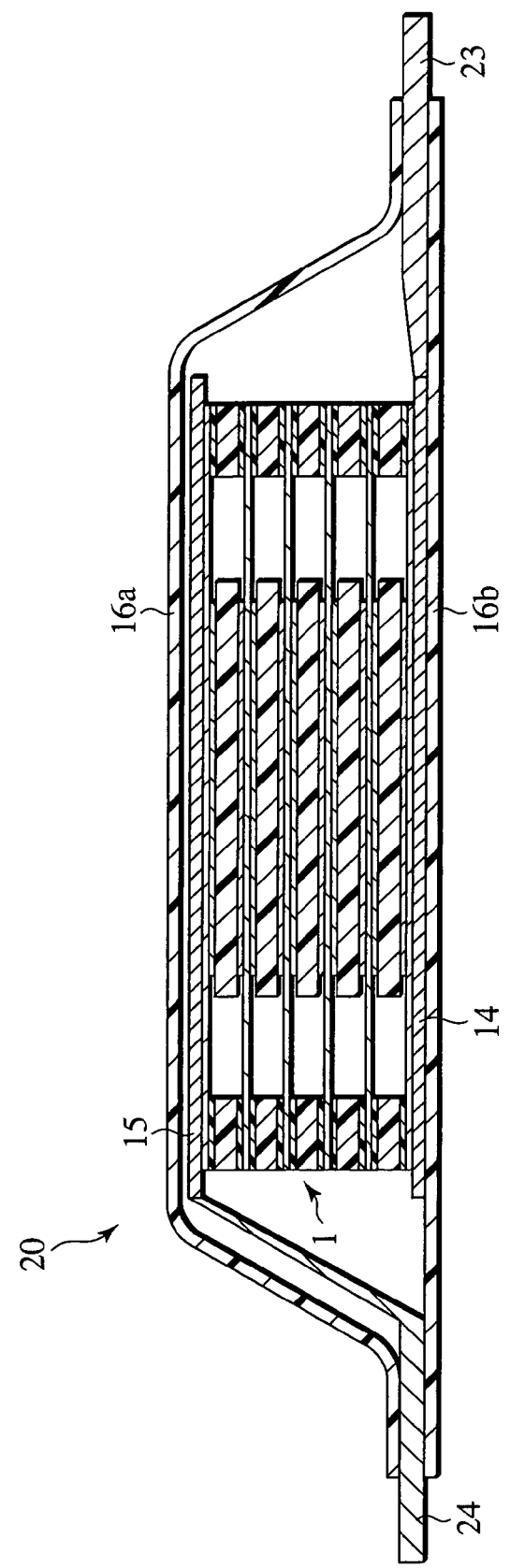
FIG. 5 is a cross sectional view taken on line V—V of FIG. 4.

Using an electrode stacked body 1 formed in this way, a bipolar battery 20 shown in FIGS. 4 and 5 is made. In the bipolar battery 20, later-described positive and negative electrode terminal plates 14 and 15 are provided on the end collectors 7 of the electrode stacked body 1, and further, positive and negative electrode leads 23 and 24 are connected to the positive and negative terminal plates 14 and 15, respectively. The positive and negative electrode leads 23 and 24 are led outside from the end edges of battery packaging materials 16a and 16b, constructing the positive and negative electrode leads 23 and 24, respectively.

Hereinafter, description will be given regarding the collectors 2 and 7, the positive and negative electrode layers 3 and 4, the electrolyte layer 5, the battery packaging materials 16a and 16b, the terminal plates 14 and 15, and the leads 23 and 24, which can be used for this bipolar battery.

(Collector)

The collectors 2 and 7 have to be thin films which can be stacked and wound. Therefore, as far as the manufacturing process is concerned, it is preferable that the collectors are manufactured by a thin film manufacturing technology such as spray coating. The material therefor includes metal powder as a major constituent and resin as a binder. For the metal powder, aluminum, copper, titanium, nickel, stainless steel (SUS) and alloy thereof can be used. The metal powder can be used individually, or two or more kinds of metal powder can be mixed for use. Moreover, the binder can be, but is not particularly limited to, a resin binder such as epoxy resin, for example. In addition, a conductive polymer can be used.

A manufacturing method of the collectors 2 and 7 is as follows. First, the metal powder, the binder and the solvent are mixed to make collector metal paste. The metal paste is then made into a thin film by a spray coating method or the like, and the thin film is heated. Although, collectors 2 and 7 are single layered in many cases, they may be multilayered, formed by stacking collectors each containing different kind of metal powder. A thickness of each of the collectors is not particularly limited, but it is usually preferable that the thickness is within a range of 1 to 100 μm.

(Positive Electrode Layer)

The positive electrode layer 3 mainly contains a positive electrode active material. In addition to that, an electrolyte, a lithium salt, a conductive material and the like are contained in order to improve ion conductivity. It is particularly preferable that at least one of the positive and negative electrode layers 3 and 4 contains the electrolyte, preferably a solid polymer electrolyte. In order to further improve a battery performance of the bipolar battery, it is more preferable that the electrolyte is contained in both of the positive and negative electrode layers 3 and 4.

For the positive electrode active material, a composite oxide of transition metal and lithium can be used. Specifically, the positive electrode active material may include Li—Co based composite oxide such as $LiCoO_2$, Li—Ni based composite oxide such as $LiNiO_2$, Li—Mn based composite oxide such as $LiMn_2O_4$ having a spinel structure, and Li—Fe based composite oxide such as $LiFeO_2$. In addition, phosphate compound or sulfate compound of transition metal and lithium such as $LiFePO_4$, transition metal oxide or sulfide such as $V_2O_5$, $MnO_2$, $TiS_2$, $MoS_2$ and $MoO_3$, and $PbO_2$, AgO and NiOOH may also be included.

Considering a manufacturing process, a particle size of the positive electrode active material is not limited as long as the positive electrode material can be formed into paste and then into a film by spray coating or the like. In order to further reduce electrode resistance of the bipolar battery, it is preferable to use the positive electrode active material with a particle size smaller than that of the material generally used for a lithium ion battery having a liquid electrolyte. Specifically, the preferable mean particle size of the positive electrode active material is within a range of 0.1 to 10 μm.

For the electrolyte contained in the positive electrode layer 3, a solid polymer electrolyte, a polymer gel electrolyte and a stack thereof can be used. The positive electrode layer 3 can be formed into a multi-layered construction, or formed into a layer having different kinds of electrolytes and different kinds and particle sizes of active materials and further, different compound ratios thereof, on the sides of the collector and the electrolyte. Preferably, polymer and an electrolysis solution, which are contained in the polymer gel electrolyte, have a mass ratio of 20:80 to 98:2.

The polymer gel electrolyte is made of the solid polymer electrolyte with ion conductivity containing the electrolysis solution therein. Further, the polymer gel electrolyte also includes polymer which has no lithium ion conductivity and holds the same electrolysis solution among the chains thereof.

The electrolysis solution (an electrolyte salt and a plasticizer) contained in the polymer gel electrolyte is not limited as long as it is generally used for a lithium ion battery. For example, the electrolyte salt is at least one kind of lithium salt selected from inorganic acid salts which are $LiPF_6$, $LiBF_4$, $LiClO_4$, $LiAsF_6$, $LiTaF_6$, $LiAlCl_4$ and $Li_2B_{10}Cl_{10}$, and organic acid salts such as $CF_3SO_3Li$, $(CF_3SO_2)_2NLi$ and $(C_2F_5SO_2)_2NLi$. The plasticizer may include, but is not limited to, an aprotic solvent of at least one kind of material or mixture of two or more kinds of materials selected from: cyclic carbonates such as ethylene carbonate and propylene carbonate; chain carbonates such as dimethyl carbonate, methyl ethyl carbonate and diethyl carbonate; ethers such as tetrahydrofuran, 2-methyltetrahydrofuran, 1,4-dioxane, 1,2-dimethoxyethane and 1,2-dibutoxyethane; lactones such as γ-butyrolactone; nitriles such as acetonitrile; esters such as methyl propionate; amides such as dimethylformamide; methyl acetate, methyl formate and the like.

The polymer, which has no lithium ion conductivity and is used for the polymer gel electrolyte, may include, but is not limited to, polyvinylidene fluoride (PVDF), polyvinyl chloride (PVC), polyacrylonitrile (PAN), polymethylmethacrylate (PMMA) and the like. Note that it is possible to consider that PAN, PMMA and the like could be more like polymer with ion conductivity since they have slight ion conductivity. However, they exemplify the polymer without lithium ion conductivity herein.

The other lithium salts contained in the positive electrode layer 3 is, for example, inorganic acid salts such as $LiPF_6$, $LiBF_4$, $LiClO_4$, $LiAsF_6$, $LiTaF_6$, $LiAlCl_4$ and $Li_2B_{10}Cl_{10}$, organic acid salts such as $(CF_3SO_2)_2NLi$ and $(C_2F_5SO_2)_2NLi$, and a mixture thereof, but not are limited thereto. Further, the conductive material may include acetylene black, carbon black, graphite and the like, but not is limited thereto.

A compound ratio of the positive electrode active material, the electrolyte, a lithium salt, and the conductive material should be decided in consideration of the intended use of the battery (prioritizing power or energy, for example) and the ion conductivity. For example, if the compounding amount of the electrolyte, particularly the solid polymer electrolyte is too small in the positive electrode layer 3, resistance of ion conductivity and ion diffusion within the positive electrode active material layer becomes large, reducing the battery performance. On the other hand, an excessive compounding amount of the electrolyte, particularly solid polymer electrolyte, in the positive electrode layer causes a reduction in the energy density of the battery. Therefore, the compounding amount of the solid polymer electrolyte, which is adequate for the purpose, is decided in view of these factors.

The thickness of the positive electrode layer 3 is not particularly limited, but should be decided in consideration of the intended use of the battery and ion conductivity. In general, the thickness of the positive electrode active material layer 3 is within a range of 10 to 500 μm.

(Negative Electrode Layer)

The negative electrode layer 4 mainly contains a negative electrode active material. In addition to that, an electrolyte, a lithium salt, a conductive material and the like may be contained for enhancing ion conductivity. Since the materials of the negative electrode layer 4 are basically the same as those of the positive electrode layer 3 apart from the negative electrode active material, description thereof is omitted herein.

The negative electrode active material is preferably metal oxide, lithium-metal composite oxide, carbon or the like, and more preferably, carbon, transition metal oxide or lithium-transition metal composite oxide. Yet more preferably, titanium oxide, lithium-titanium composite oxide or carbon is used therefore. These materials can be individually used, or two or more of them can be used together.

(Electrolyte Layer)

For the electrolyte layer 5, polymer gel electrolyte is preferably used. The electrolyte layer 5 can be multi-layered, or formed into a layer in which different kinds of electrolytes and different compound ratios between the components on each side of the positive and negative electrode layers 3 and 4. When the polymer gel electrolyte is used, polymer and an electrolysis solution, which are contained in the polymer gel electrolyte, preferably have a mass ratio of 20:80 to 98:2.

Such polymer gel electrolyte is made of a solid polymer electrolyte with ion conductivity containing an electrolysis solution. However, the polymer gel electrolyte may further include the one made of polymer which has no lithium ion conductivity and holds the same electrolysis solution among the chains thereof. Since they are the same as the polymer gel electrolyte included in the positive electrode layer 3, the description thereof is omitted herein.

As described earlier, the solid polymer electrolyte and the polymer gel electrolyte may be contained in the positive electrode layer 3 and/or negative electrode layer 4, in addition to the electrolyte layer 5. Different polymer electrolytes may be used for the positive electrode layer 3, the negative electrode layer 4, and the electrolyte 5, respectively. The same polymer electrolyte may be used for all of the layers.

The thickness of the electrolyte layer 5 is not particularly limited. However, in order to obtain a compact bipolar battery, the thinnest possible layer is preferable within a thickness range that ensures the functions of the electrolyte layer. In general, the thickness of the solid polymer electrolyte layer is within a range of 10 to 100 μm. It is also easy to form the electrolyte layer so as to cover top surfaces as well as the peripheral side surfaces of the positive and negative electrode layers, while making use of a feature of the manufacturing process. Further, the electrolyte layer 5 is not required to have a constant thickness considering its function and performance.

(Battery Packaging Material)

In the bipolar battery 20, the electrode stacked body 1 is preferably housed in the battery packaging materials 16a and 16b or a battery case, in order to prevent impacts from the outside while using the battery and environmental deterioration.

From the viewpoint of lightweightness, for the battery packaging materials 16a and 16b, it is preferable to use a battery packaging material such as an aluminum laminate packaging material or a polymer-metal composite laminate film, in which metal (including alloy) such as aluminum, stainless steel, nickel, or copper is covered with an insulating material such as a polypropylene film. A preferable method of housing the electrode stacked body 1 is as follows. The electrode stacked body 1 is covered with the battery packaging materials 16a and 16b from the top and bottom thereof, and the peripheries of the packaging materials 16a and 16b are partially or entirely joined by thermal welding. Therefore, the electrode stacked body 1 is housed and sealed. The positive and negative electrode leads 23 and 24 are sandwiched by the thermal welded portions and exposed outside of the battery packaging materials 16a and 16b.

It is preferable to use the polymer-metal composite laminate film, the aluminum laminate packaging material and the like, which have excellent thermal conductivity. This is because they can efficiently transfer heat from a heat source of a vehicle to the inside of the battery, and can swiftly heat the inside of the battery up to battery operating temperature.

(Positive and Negative Electrode Terminal Plates)

The positive and negative electrode terminal plates 14 and 15 have functions as terminals. The thinnest possible terminal plates are preferable from the viewpoint of a thin bipolar battery. However, since the positive and negative electrode layers 3 and 4, the electrolyte layer 5, and the collectors 2 and 7 which construct the electrode stacked body 1 have low mechanical strength, the electrode terminal plates are required to have enough strength to sandwich them from each side thereof. Additionally, in the light of limiting electric resistance in the terminal plates, the preferable thicknesses of the positive and negative electrode terminal plates 14 and 15 are usually within a range of 0.1 to 2 mm.

For a material of the positive and negative electrode terminal plates 14 and 15, aluminum, copper, titanium, nickel, stainless steel (SUS) or alloy thereof can be utilized. It is preferable to use aluminum from the viewpoint of corrosion resistance, manufacturability and cost efficiency.

Either the same material or different materials can be used for the positive and negative electrode terminal plates 14 and 15. Moreover, the positive and negative electrode terminal plates 14 and 15 may be multi-layered, formed by stacking different materials.

As described above, the positive and negative electrode terminal plates 14 and 15 have functions of terminals as well as templates. To be specific, the bipolar battery of the present invention can construct a later-described assembled battery, but can also be used by being directly affixed to heat source such as a motor. In the latter case, the positive and negative electrode terminal plates can be used as templates in order to fit the shape of the bipolar battery to the external shape of the heat source. When using the positive and negative electrode terminal plates 14 and 15 as terminals and templates, the shapes of these terminal plates are formed into shapes by tracing the shape of the outer surface of the heat source of the vehicle.

Additionally, the battery packaging materials can be used as templates instead of the terminal plates. In this case, the terminal plates, which are provided at positions opposite the battery packaging materials, may have the same shapes as the collectors on which the terminal plates are placed. The shapes of the terminal plates can be formed by press working or the like. Note that the terminal plates, which are provided at the positions opposite the battery packaging materials, may be formed by spray coating similarly to the collectors.

(Positive and Negative Electrode Leads)

With regard to the positive and negative electrode leads 23 and 24, aluminum, copper, titanium, nickel, stainless steel (SUS), alloy thereof or the like can be utilized. As described earlier, the bipolar battery of the present invention is sometimes provided directly on the heat source. In this case, a distance between the heat source of the vehicle and both positive and negative electrode leads 23 and 24 may become short, so that there is a possibility that a part of each of the leads led out from the battery packaging materials may contact with the heat source, causing leakage. Thus, vehicle parts (especially electronic equipment) may be affected. Hence, it is preferable that the positive and negative electrode leads 23 and 24 are covered with heat-shrinkable tubing having thermal-resistance and insulation.

In FIG. 5, the positive and negative electrode leads 23 and 24 are connected to the positive and negative electrode terminal plates 14 and 15, respectively. However, the positive and negative electrode leads 23 and 24 can be directly connected to the collectors 7, as a matter of course.

Hereinbelow, an example of the present invention will be described.

(Evaluation of Liquid Junction)

A bipolar battery similar to the one in the aforementioned embodiment was made and liquid junction between the single cells therein was evaluated.

The bipolar battery which was actually made as the example is as follows.

For the collector, a stainless steel foil (SUS foil) was used. Thickness of the stainless steel foil is about 20 μm. The positive or negative electrode layer was formed on one surface of the end collector, and the positive and negative electrode layers were formed on the collector.

In the positive electrode layer, $LiMn_2O_4$ was used as the positive electrode active material, acetylene black was used as the conductive material, polyvinylidene fluoride (PVDF) was used as the binder, and N-methyl-2-pyrrolidone (NMP) was used as a solvent for adjusting viscosity. These materials were mixed and positive electrode slurry was prepared. The positive electrode slurry was applied on one surface of the stainless steel foil, which serves as the collector. The slurry was then dried, thus forming the positive electrode layer.

In the negative electrode layer, $Li_4Ti_5O_{12}$ was used as the negative electrode active material, an acetylene black was used as the conductive material, PVDF was used as the binder, and NMP was used as a solvent to adjust viscosity. These materials were mixed and negative electrode slurry was prepared. The negative electrode slurry was applied on the other surface of the stainless steel foil on which the positive electrode layer was applied. The slurry was then dried, thus forming the negative electrode layer.

The polymer gel electrolyte layer was made of a 50 μm-thick polypropylene (PP) nonwoven fabric holding a gel electrolyte. The gel electrolyte contained 5 wt % of polymer (copolymer of polyethylene oxide and polypropylene oxide), 95 wt % of a mixed solvent (ethylene carbonate (EC): dimethyl carbonate (DMC)=1:3) and 1.0 M of $(C_2F_5SO_2)_2NLi$ to the mixed solvent of EC and DMC.

For the first resin forming the sealing layer, modified polypropylene (PP) with a melting point of 94 degrees centigrade was used. For the second resin, polyamide-based resin with a melting point of 200 degrees centigrade was used. The modified PP has different degrees of polymerization, and has different melting points from that of polyamide-based resin.

The electrode stacked body 1 was made by stacking the collectors, the end collectors, and the polymer gel electrolyte layers, and by providing the sealing layers between each of the collectors. The sealing layers were formed by heating and pressurizing the peripheries of the end collectors from the top and the bottom thereof at 180 degrees centigrade while the single cells were stacked. The number of stacked single cells was five.

Next, the positive and negative electrode terminal plates, and the positive and the negative electrode leads were provided in the electrode stacked body. The electrode stacked body thus obtained was housed within the battery packaging materials, and the peripheral edges of the battery packaging materials were thermally welded, thus forming the bipolar battery shown in FIG. 4.

In addition, as a comparative example for the evaluation, a bipolar battery with a similar construction but having no sealing layers was formed.

Liquid junction was evaluated by conducting a charge/discharge cycle tests of the bipolar batteries of the example and the comparative example. One cycle of charge/discharge includes charging current of 0.5 C and discharging current of 0.5 C.

As a result, in the bipolar battery of the example, no liquid junction (short circuit) was observed between the electrodes even after fifty cycles or more of charging/discharging.

On the other hand, in the bipolar battery of the comparative example, the electrolysis solution oozed out of the single cell layer during the first cycle of charging, and contacted with the electrolyte layer of the other single cell layer, causing liquid junction. Therefore, the voltage of the battery was significantly reduced.

These evaluation results revealed that provision of the sealing layer for each of the single cells can surely prevent liquid junction between the single cells.

(Adhesive Strength Test)

Next, six stainless steel foils which construct the collectors and the end collectors were layered with the sealing layer placed between each of the foils, and T-type peel test was conducted. This T-type peel test was conducted in conformity with JIS K6854.

As for the sealing layer, two samples A and B shown in FIGS. 6A and 6B were prepared using modified PPs as the first resin, respectively having melting points of 102, 94, and 88 degrees centigrade, and polyamide-based resin having a melting point of 200 degrees centigrade as the second resin.

As shown in FIG. 6A, the sample A was made such that the melting point of the first resin becomes lower as it is positioned further inside the electrode stacked body 1. Particularly speaking, the modified PP with the melting point of 102 degrees centigrade was used as the first resin 10 of the outermost sealing layers 9a, and the polyamide-based resin with the melting point of 200 degrees centigrade was used as the second resin 11. For the subsequent sealing layers 9b, the modified PP with the melting point of 94 degrees centigrade was used as the first resin 10 thereof, and the polyamide-based resin with the melting point of 200 degrees centigrade was used as the second resin 11. For the innermost sealing layer 9c, the modified PP with the melting point of 88 degrees centigrade was used as the first resin 10 thereof, and the polyamide-based resin with the melting point of 200 degrees centigrade was used as the second resin 11.

As shown in FIG. 6B, the sample B was formed such that the modified PP with the melting point of 102 degrees centigrade was used as the first resin 10 for all the sealing layers, and the polyamide-based resin with the melting point of 200 degrees centigrade was used as the second resin 11.

T-type peel tests were conducted in a way that the bottom surface of the electrode stacked body of each of these samples made according to the above was fixed and peeled from the top.

These T-type peel tests were carried out at room temperature (25 degrees centigrade), with a tension speed of 200 mm/min.

In sample A, the layers remained adhered to each other until tensile strength reached 54N/25 mm. On the other hand, in sample B, the middle layer was peeled off at 35N/25 mm.

Figure 7:
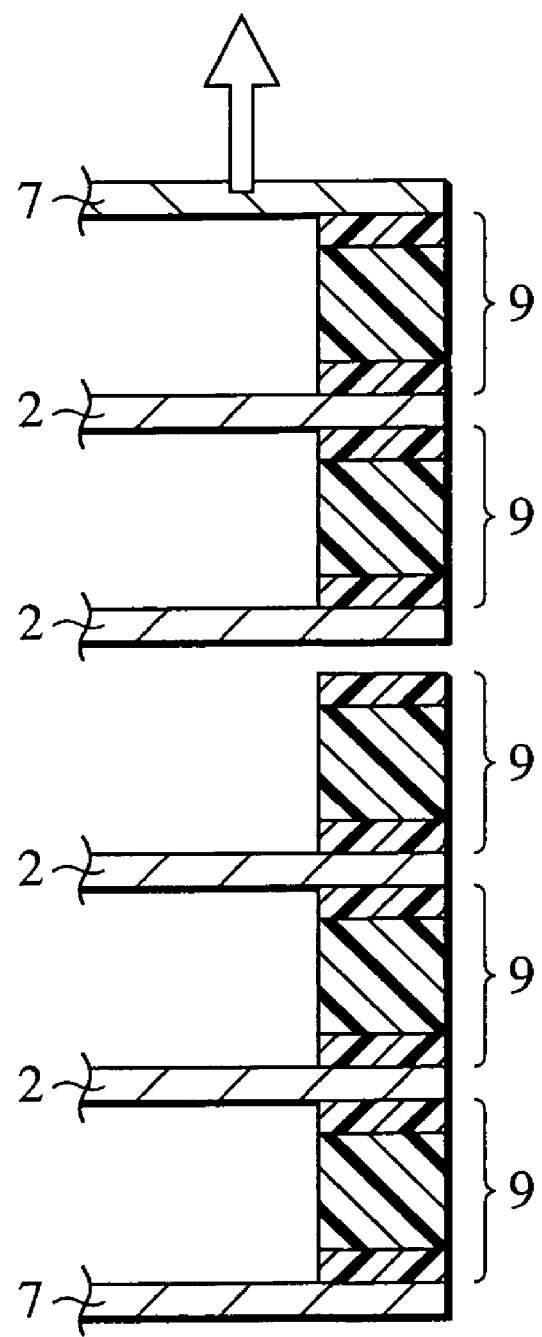
FIG. 7 is a view illustrating a result of the adhesive strength test.

This test was conducted twenty times, and the layer in the middle of sample B always peeled off as shown in FIG. 7. On the contrary, the layers in sample A randomly peeled off when forces of 54N/25 mm or more were applied.

According to the above, it is considered possible to adhere a plurality of stacked stainless steel foils with an uniform strength by using the first resin 10 having different melting points in each of the sealing layers 9 such that the melting points of the first resin 10 rise from the middle toward the outside.

According to the first embodiment and the example to which the present invention is applied, in the battery having a plurality of stacked single cells 6, provision of the sealing layers 9 for each of the single cells 6 prevents liquid junction between the single cells 6, and a highly durable and reliable battery can be provided.

Second Embodiment

A second embodiment of the present invention is an assembled battery in which the plurality of the bipolar batteries 20 of the foregoing first embodiment is connected to each other.

Figure 8:
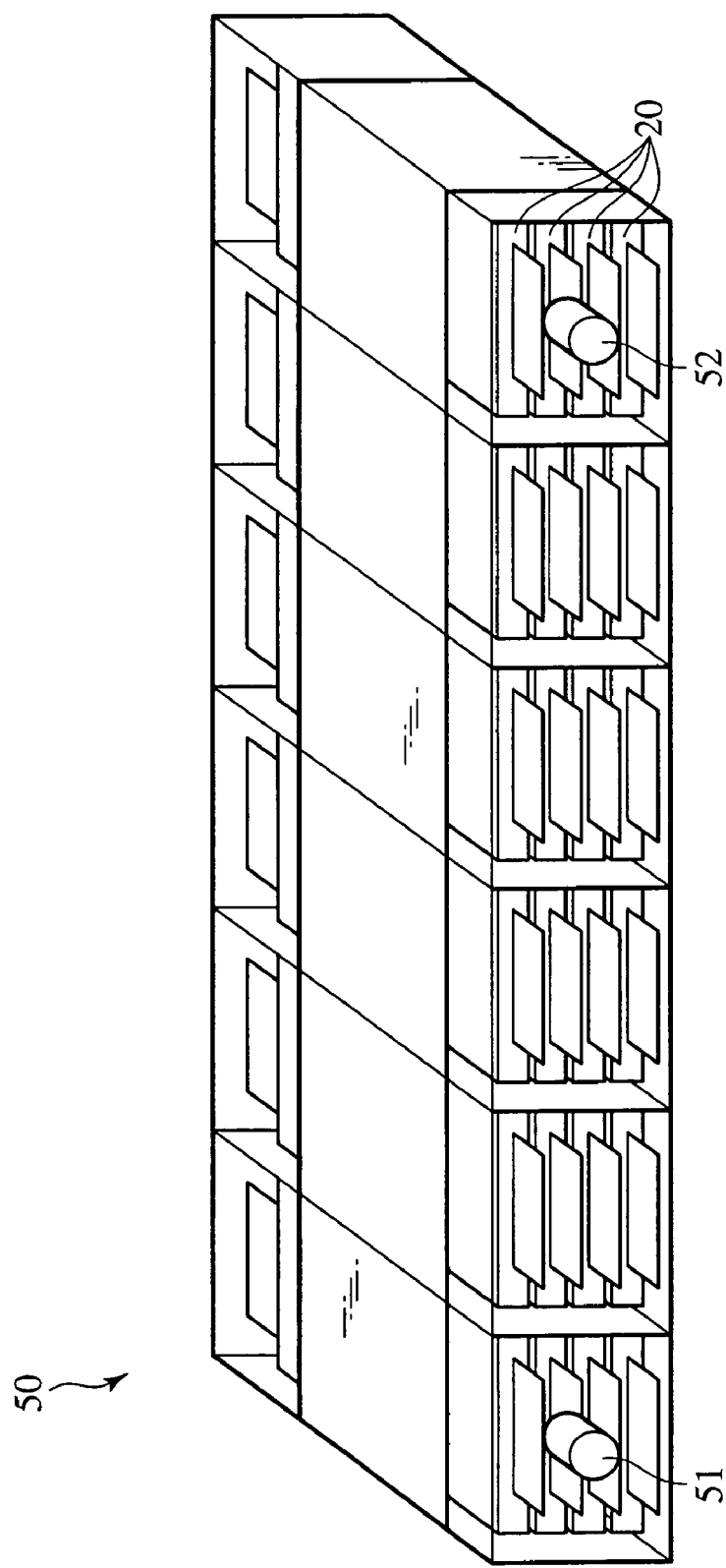
FIG. 8 is a perspective view illustrating an assembled battery applying the bipolar battery of the present invention.
Figure 9:
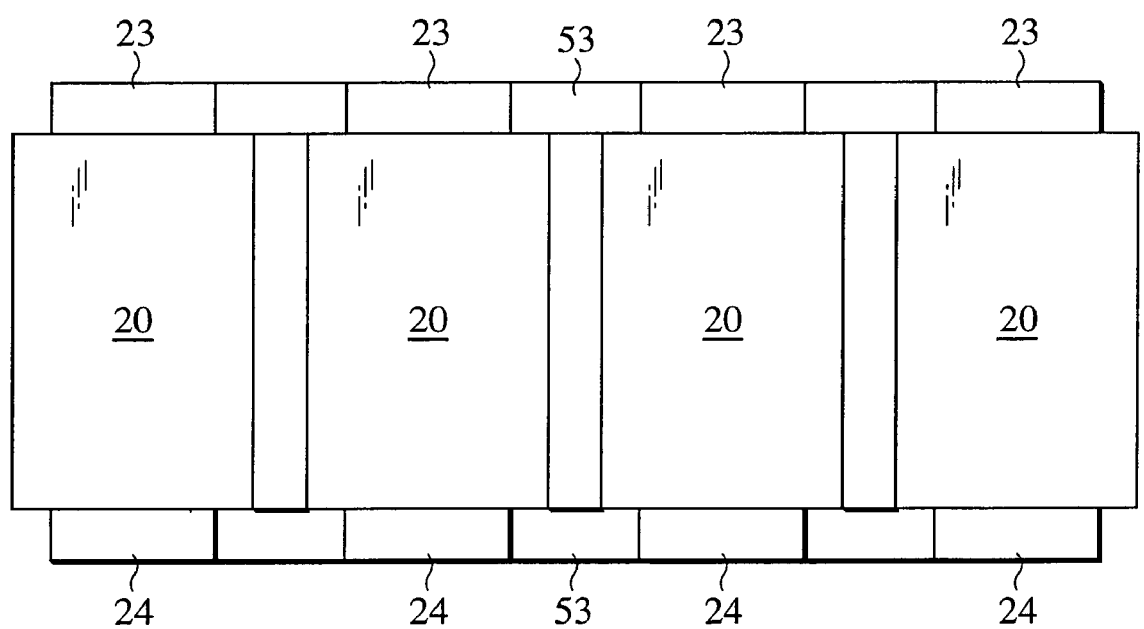
FIG. 9 is a top plan view illustrating an inner structure of the assembled battery applying the bipolar battery of the present invention.

As shown in FIGS. 8 and 9, in this assembled battery 50, the plurality of bipolar batteries 20 of the foregoing first embodiment which is connected in series is further connected in parallel. Between the bipolar batteries 20, the positive electrode leads 23 and the negative electrode leads 24 of each of the batteries are connected by conductive members 53. The plurality of bipolar batteries which is electrically connected is connected to terminals 51 and 52 provided on one side surface of the assembled battery 50.

In this assembled battery 50, the terminals of the batteries 20 and the conductive members 53 can be connected using a method such as ultrasonic welding, heat welding, laser welding, rivet, crimping and electron beam. By using such a connecting method, it is possible to manufacture a battery having long-term reliability.

According to the assembled battery of the second embodiment, it is possible to obtain the assembled battery with a high capacity and high power by using the batteries of the foregoing first embodiment to form the assembled battery. In addition, since each of the batteries is highly reliable, the assembled battery having a long-term reliability can be further improved.

With regard to the connection of the batteries 20 as the assembled battery, all of the plurality of batteries 20 may be connected in parallel, and alternatively, all of the plurality of batteries 20 may be connected in series.

Third Embodiment

A third embodiment is an assembled battery module in which the plurality of assembled batteries of the aforementioned second embodiment are connected to each other.

Figure 10:
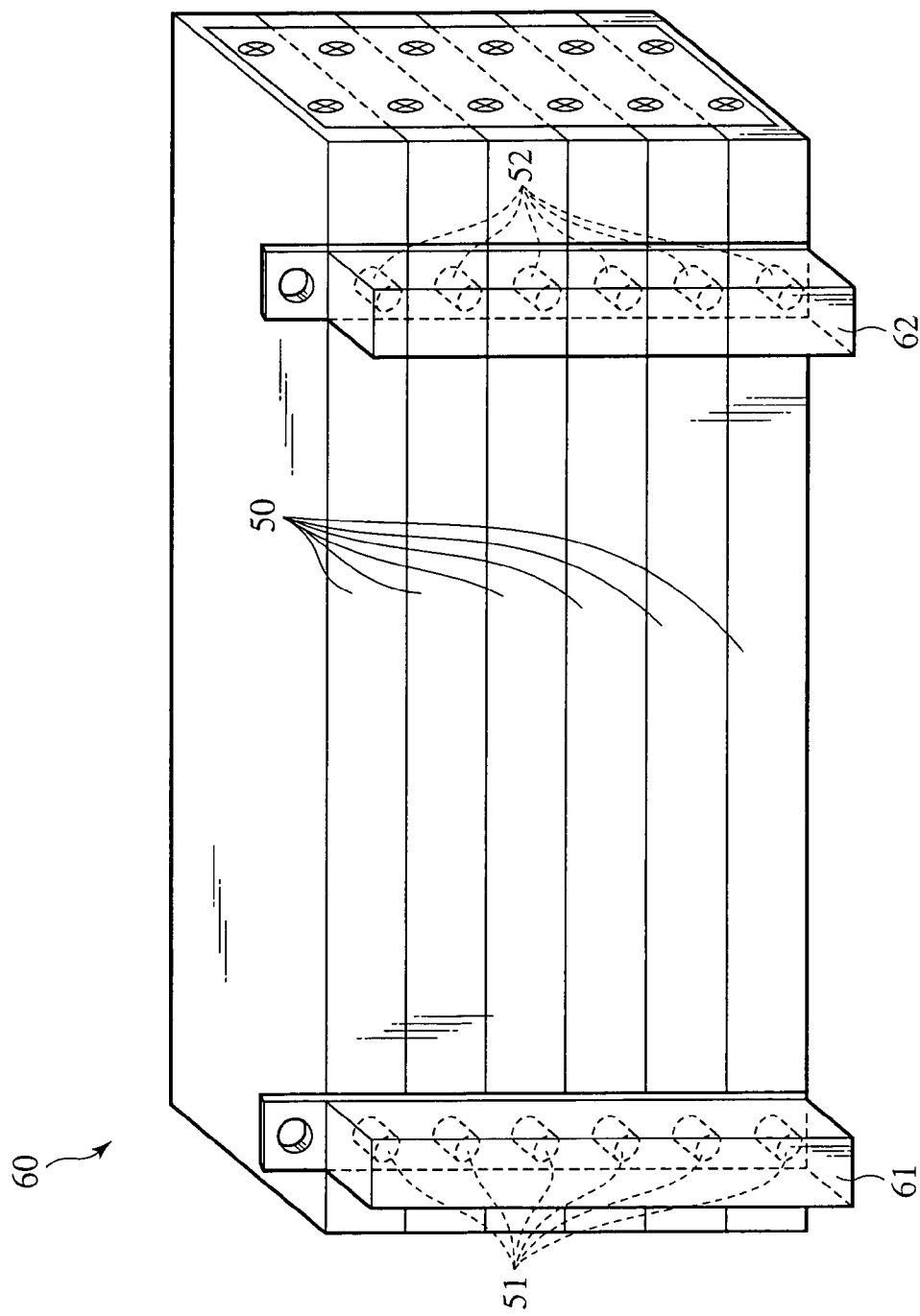
FIG. 10 is a perspective view illustrating an assembled battery module applying the bipolar battery of the present invention.

As shown in FIG. 10, the assembled battery module 60 is formed into a module in a way that the plurality of assembled batteries 50 of the foregoing second embodiment are stacked, and the terminals 51 and 52 of each of the assembled batteries 50 are connected by conductive members 61 and 62.

The modularization of the assembled batteries 50 in this way facilitates battery control and forms an optimal assembled battery module to be mounted on a vehicle such as an electric vehicle and a hybrid vehicle. The assembled battery module 60 has a long-term reliability since the foregoing assembled batteries are used therefor.

(Fourth Embodiment)

A fourth embodiment is a vehicle which mounts the assembled battery module according to the aforementioned third embodiment and uses the assembled battery module as a power source of a motor. The vehicle using the assembled battery module as the power source for the motor is, for example, an electric vehicle and a hybrid vehicle, in which wheels are driven by the motor.

Figure 11:
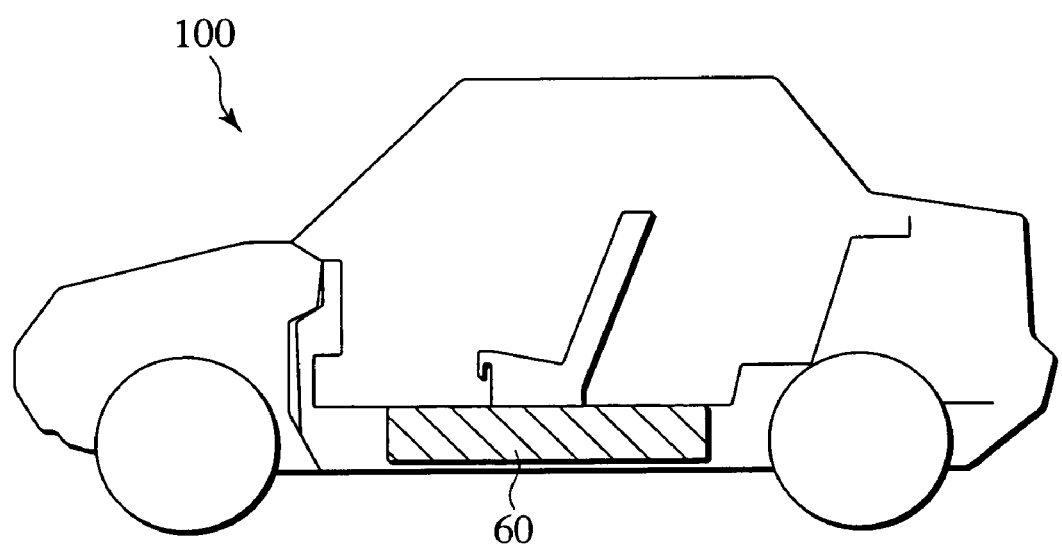
FIG. 11 is a view illustrating a vehicle having the assembled battery module applying the bipolar battery of the present invention.

For reference, FIG. 11 shows a vehicle 100 having the assembled battery module 60 mounted thereon. The assembled battery module 60 mounted on the vehicle has the characteristics described earlier. Therefore, the vehicle on which the assembled battery module 60 is mounted has high durability and is capable of providing sufficient power over a long period of time.

The entire content of a Japanese Patent Application No. P2002-323971 with a filing date of Nov. 7, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A bipolar battery, comprising:
   a bipolar electrode in which a positive electrode is provided on one surface of a collector, and a negative electrode is provided on the other surface of the collector;
   a gel electrolyte sandwiched between the positive electrode and the negative electrode; and
   a sealing layer which is provided between the collectors and surrounds a periphery of a single cell including the positive electrode, the negative electrode, and the gel electrolyte,
   wherein the sealing layer is made of a first resin provided to be positioned on sides of the collectors and a non-conductive second resin which is sandwiched by the first resin and has a higher melting point than that of the first resin, and
   the collectors and the sealing layer are thermally welded at a temperature between the melting points of the first resin and the second resin.

2. A bipolar battery according to claim 1,
   wherein an electrode stacked body is formed by stacking a plurality of the bipolar electrodes, the gel electrolytes and the sealing layers, and
   the melting point of the first resin becomes higher as it is positioned further outside the electrode stacked body.

3. A bipolar battery according to claim 1,
   wherein the first resin and the second resin are at least two resins, which have a higher melting point and a lower melting point than the temperature of the thermal welding, respectively, and which are selected from a group containing polypropylene, polyethylene, polyurethane, thermoplastic olefin rubber, polyamide-based resin, polytetrafluoroethylene, polyvinylidene fluoride, polystyrene and silicone rubber.

4. A bipolar battery according to claim 1,
   wherein the positive electrode includes composite oxide of lithium and transition metal, and the negative electrode includes carbon or composite oxide of lithium and transition metal.

5. An assembled battery, comprising:
   a plurality of bipolar batteries connected in series and/or in parallel,
   the bipolar batteries, comprising:
      a bipolar electrode in which a positive electrode is provided on one surface of a collector, and a negative electrode is provided on the other surface of the collector;
      a gel electrolyte sandwiched between the positive electrode and the negative electrode; and
      a sealing layer which is provided between the collectors and surrounds a periphery of a single cell including the positive electrode, the negative electrode, and the gel electrolyte,
      wherein the sealing layer is made of a first resin provided to be positioned on sides of the collectors and a non-conductive second resin which is sandwiched by the first resin and has a higher melting point than that of the first resin, and
      the collectors and the sealina layer are thermally welded at a temperature between the melting points of the first resin and the second resin.

6. A vehicle, comprising
   an assembled battery including a plurality of bipolar batteries connected in series and/or in parallel,
   the bipolar batteries comprising:
      a bipolar electrode in which a positive electrode is provided on one surface of a collector, and a negative electrode is provided on the other surface of the collector;
      a gel electrolyte sandwiched between the positive electrode and the negative electrode; and
      a sealing layer which is provided between the collectors and surrounds a periphery of a single cell including the positive electrode, the negative electrode, and the gel electrolytes,
      wherein the sealing layer is made of a first resin provided to be positioned on sides of the collectors and a non-conductive second resin which is sandwiched by the first resin and has a higher melting point than that of the first resin, and
      the collectors and the sealing layer are thermally welded at a temperature between the melting points of the first resin and the second resin.

7. A method for manufacturing a bipolar battery, comprising:
- forming a bipolar electrode in which a positive electrode is provided on one surface of a collector and a negative electrode is provided on the other surface of the collector;
- sandwiching a gel electrolyte between the positive electrode and the negative electrode, and simultaneously sandwiching a sealing layer between the collectors in a periphery of a single cell including the positive electrode, the negative electrode, and the gel electrolyte, the sealing layer being made of a first resin provided to be positioned on sides of the collectors and a non-conductive second resin which is sandwiched by the first resin and has a higher melting point than that of the first resin; and
- heating and pressurizing a portion of the sealing layers from sides of end collectors in a state where a plurality of the bipolar electrodes, the gel electrolytes and the sealing layers are stacked on each other, at a temperature between the melting points of the first resin and the second resin.

* * * * *